US009593707B2

(12) United States Patent
Weis et al.

(10) Patent No.: US 9,593,707 B2
(45) Date of Patent: Mar. 14, 2017

(54) FASTENER WITH PROTECTED DECORATIVE CAP

(71) Applicant: McGard LLC, Orchard Park, NY (US)

(72) Inventors: Kyle M. Weis, Tonawanda, NY (US); John F. Mondo, Hamburg, NY (US); David C. Meyer, Boston, NY (US)

(73) Assignee: McGard LLC, Orchard Park, NY (US)

(*) Notice: Subject to any disclaimer, the term of this patent is extended or adjusted under 35 U.S.C. 154(b) by 191 days.

(21) Appl. No.: 14/582,367

(22) Filed: Dec. 24, 2014

(65) Prior Publication Data

US 2015/0184687 A1 Jul. 2, 2015

Related U.S. Application Data

(60) Provisional application No. 61/921,249, filed on Dec. 27, 2013.

(51) Int. Cl.
*F16B 37/14* (2006.01)

(52) U.S. Cl.
CPC .................................... *F16B 37/14* (2013.01)

(58) Field of Classification Search
CPC ....................................................... F16B 37/14
USPC ................... 411/372.5, 372.6, 373, 377, 431
See application file for complete search history.

(56) References Cited

U.S. PATENT DOCUMENTS 72,013 A * 12/1867 Gardner .................. F16B 37/14 411/373
D157,484 S 8/1948 Gade
3,134,290 A 5/1964 Jentoft
D220,027 S 3/1971 Myers
3,897,712 A 8/1975 Black
4,616,535 A 10/1986 Chiavon
4,693,655 A 9/1987 Omori
5,324,149 A 6/1994 Bainbridge et al.
5,364,213 A 11/1994 Teramura
5,590,992 A 1/1997 Russel
5,827,029 A 10/1998 Denman
D412,435 S 8/1999 Cultice, Jr.
6,092,968 A 7/2000 Lanham et al.
6,302,630 B1 * 10/2001 Grant ........................ A47G 3/00 411/372.6
D460,398 S 7/2002 Berry et al.
D488,715 S 4/2004 Plumer (Continued)

FOREIGN PATENT DOCUMENTS

JP 2005-313874 A 11/2005
JP 2013-001164 A 1/2013
KR 20-2013-0006151 U 10/2013

OTHER PUBLICATIONS

The International Search Report (ISR) for International (PCT) Application No. PCT/US2014/072335; Publication No. WO 2015/100407; dated Apr. 22, 2015.

(Continued)

*Primary Examiner* — Flemming Saether

(74) *Attorney, Agent, or Firm* — Rowland Richards, Esq.; Harter Secrest & Emery LLP

(57) ABSTRACT

A fastener having a fastener body and a protected decorative cap arranged on a head end of the fastener body in a manner that protects the decorative cap from fastener torquing forces applied to said head end that might otherwise damage, disfigure or loosen the cap and that facilitates attachment of the decorative cap to the fastener body.

5 Claims, 13 Drawing Sheets

(56) References Cited

U.S. PATENT DOCUMENTS

| | | | | |
|---|---|---|---|---|
| 6,860,692 | B2 | 3/2005 | Van Ingen et al. | |
| 7,004,700 | B2 * | 2/2006 | Wilson | F16B 41/005<br>301/37.374 |
| 9,353,776 | B2 * | 5/2016 | Marczynski | F16B 1/0071 |
| 2003/0202860 | A1 | 10/2003 | Wilson | |
| 2007/0189877 | A1 * | 8/2007 | Wells | F16B 23/0092<br>411/372.5 |
| 2008/0166203 | A1 | 7/2008 | Reynolds et al. | |
| 2012/0288346 | A1 | 11/2012 | Liu | |
| 2013/0149071 | A1 | 6/2013 | Davis et al. | |

OTHER PUBLICATIONS

The Written Opinion of the International Search Authority for International (PCT) Application No. PCT/US2014/072335; Publication No. WO 2015/100407; dated Apr. 22, 2015.

* cited by examiner

FASTENER WITH PROTECTED DECORATIVE CAP

TECHNICAL FIELD

The present disclosure relates to fasteners, including lug bolts, lug nuts and other coupling members, and more particularly, to fasteners with decorative caps.

BACKGROUND ART

By way of background, there are various fastener applications wherein decorative features are desired. Such applications include, but are not limited to, automotive wheel fasteners such as lug bolts and lug nuts. To provide a decorative effect, the exposed head portions of such fasteners are sometimes fitted with a cap having an attractive surface finish, such as chrome plating, PVD coating, etc.

BRIEF SUMMARY OF THE INVENTION

A fastener having a fastener body (16, 616, 716, 801, 802, 803, 804, 805, 816, 916) and a protected decorative cap (20, 120, 220, 320, 420, 520, 820, 920) arranged on a head end (18, 818, 918) of the fastener body in a manner that protects the decorative cap from fastener torquing forces applied to the head end that might otherwise damage, disfigure or loosen the cap and that facilitates attachment of the decorative cap to the fastener body.

In example fastener embodiments disclosed herein, the fastener includes a fastener body having a tool-engaging head (18, 818, 918) and a fastening portion (19, 119, 819, 919). The tool-engaging head has a generally radially-extending end face (23, 223, 323, 923) and a generally-longitudinally extending sidewall portion configured to engage a fastener torquing tool. A protected decorative cap (20, 120, 220, 320, 420, 520, 820, 920) is provided on the tool-engaging head. The protected decorative cap is protected from the fastener torquing tool by protective structure (26, 626, 726) on the tool-engaging head. In particular fastener embodiments disclosed herein, the sidewall portion of the fastener body's tool-engaging head may comprise a set of generally longitudinally-extending tool-engaging ridges (26, 626, 726), each tool-engaging ridge protruding generally radially outwardly from a ridge base to a ridge tip (28). The sidewall portion may further comprise a set of generally longitudinally-extending radially-recessed flutes (33) between the ridge tips. The protected decorative cap may have a generally radially-extending end face (41, 241, 341, 941) substantially covering the tool-engaging head end face, and a set of generally longitudinally-extending fingers (40, 140, 340, 440, 540) disposed in the flutes. The cap fingers are separated by spaces (42, 342) through which the ridge tips protrude, and are radially-recessed from the ridge tips so as to be protected from the fastener torquing tool.

Thus, a fastener with a protected decorative cap is provided comprising a fastener body (16, 616, 716, 801, 802, 803, 804, 805, 816, 916) orientated about a longitudinal axis (x-x) and having a tool-engaging portion (18, 818, 918) to which a driving torque may be applied and a threaded fastening portion (19, 119, 819, 919) configured and arranged to mate with a corresponding threaded element. A decorative cap (20, 120, 220, 320, 420, 520, 820, 920) overlays the tool-engaging portion. The decorative cap comprising multiple open spaces (42, 342) and the tool-engaging portion comprising multiple generally longitudinally-extending tool-engaging ridges (26, 626, 726) configured to engage a fastener torquing tool (25, 125, 225), and each of the tool-engaging ridges protruding radially outward through at least one of the spaces in the decorative cap. Each of the longitudinally-extending tool-engaging ridges may protrude generally radially outwardly to an outer ridge line (28) and the tool-engaging portion may comprise longitudinally-extending radially-recessed flutes (33) between the adjacent ridge lines. The decorative cap may comprise multiple longitudinally-extending cap fingers (40, 140, 340, 440, 540) disposed in the flutes, the cap fingers may be separated by the spaces through which the ridges protrude, and the cap fingers may be radially-recessed from the ridge lines. The tool-engaging portion may comprise a generally transversely-extending end face (23, 223, 323, 923) and the decorative cap may comprise a generally transversely-extending end face (41, 241, 341, 941) substantially covering the end face of the tool-engaging portion. The decorative cap may comprise a connector protrusion (245) extending from underside (249) of the end face of the decorative cap, the end face of the tool-engaging portion may comprise an opening (246) sized to receive the connector protrusion, and the decorative cap may be attached to the tool-engaging portion by engagement of the connector protrusion in the opening of the end face of the tool-engaging portion. The decorative cap may comprise a connector protrusion (945) extending from underside (947) of the end face (941) of the decorative cap, the end face (923) of the tool-engaging portion (918) may comprise an opening (946) sized to receive the connector protrusion, and the decorative cap may be attached to the tool-engaging portion by a resin (949) disposed between the opening and the connector protrusion. The opening in the end face of the tool-engaging portion may be threaded (963) and the resin may be disposed between the threaded opening and the connector protrusion. The decorative cap (820) may comprise a snap-fit element (845), the fastener body may comprise a groove (846) or shoulder sized to engage the snap-fit element, and the decorative cap may be attached to the tool-engaging portion by engagement of the snap-fit element with the groove or shoulder. The snap-fit element may comprise an annular snap-fit ring (845), the fastener body may comprise an annular groove or shoulder sized to engage the annular snap-fit ring, and the decorative cap may be attached to the tool-engaging portion by engagement of the annular snap-fit ring with the annular groove or shoulder. The decorative cap (820) may comprise a flange portion (848) that extends generally longitudinally and radially outwardly from the cap fingers (840) and engages a radially-enlarged medial portion (821) of the fastener body, the flange portion (848) may comprise a radially-inwardly extending annular snap-fit ring (845), the radially-enlarged medial portion (821) of the fastener body may comprise an annular groove (846) sized to receive the annular snap-fit ring, and the decorative cap may be attached to the tool-engaging portion by engagement of the snap-fit ring in the annular groove. The decorative cap (320) may further comprise a flange portion (348) that extends generally longitudinally and radially outwardly from the cap fingers and engages a radially-enlarged medial portion (21) of the fastener body. The flutes may have an outer surface that is curved and the cap fingers have a cross section profile that is curved on one or both of an inside (52, 152) and an outside (53) surface of the cap fingers. The cap fingers may have a cross section profile that is flat on one or both of an inside (252) and an outside (153, 253) surface of the cap fingers. The cap fingers may have free ends that are either curved (43, 443) or flat (143, 543). The tool-engaging ridges (626, 726) may extend longitudinally beyond (627, 727) the end face of the tool-engaging portion in order to protect the end face portion (41) of the decorative cap from the torquing tool. The end portions (727) of the tool-engaging ridges that extend longitudinally beyond the end face of the tool-engaging portion may be crimped over the end face (41) of the decorative cap. The fastener body may be selected from a group consisting of vehicle lug nuts and vehicle lug bolts. The tool-engaging portion may comprise six generally longitudinally-extending tool-engaging ridges configured to engage the fastener torquing tool and the decorative cap may comprise six open spaces. The decorative cap may be decorative by virtue of having a decorative color, material, coating, surface finish or design thereon. The decorative cap may be decorative by virtue of having a black plastic glossy surface finish. The decorative cap may be attached to the tool-engaging portion by one or more of adhesive bonding or mechanical fastening. The decorative cap comprises a sticker.

DETAILED DESCRIPTION OF THE PREFERRED EMBODIMENTS

Figure 1:
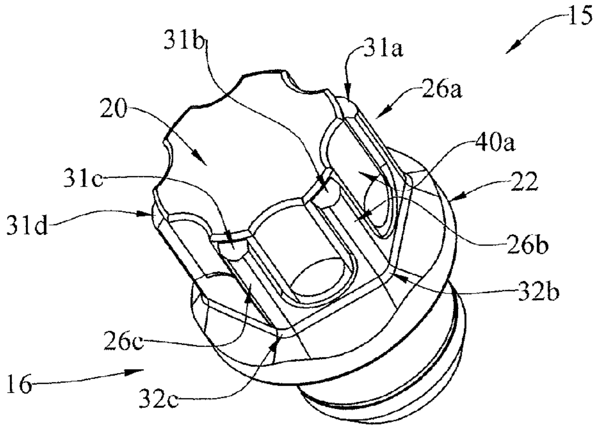
FIG. 1 is a perspective view showing one example embodiment of a fastener that may be constructed in accordance with the present disclosure.
Figure 2:
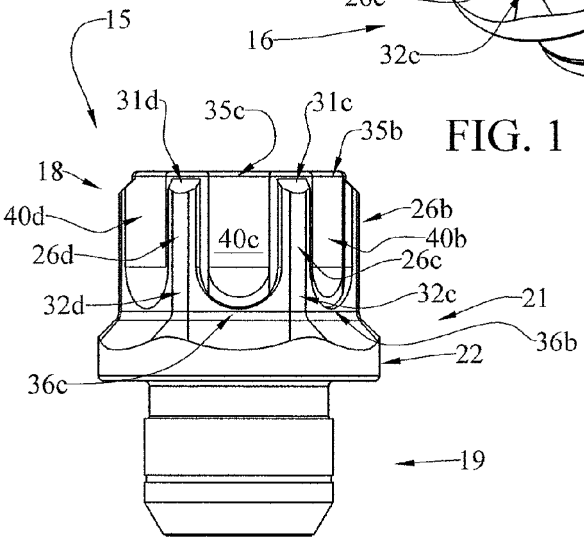
FIG. 2 is a side elevation view the fastener embodiment of FIG. 1.
Figure 3:
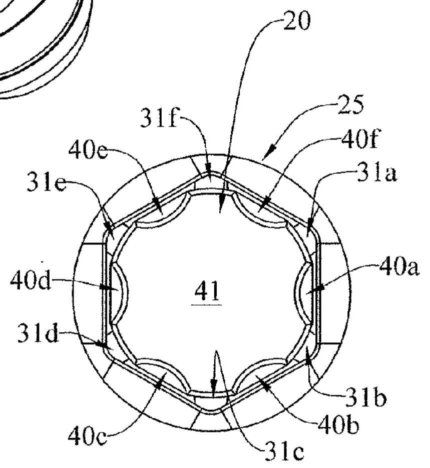
FIG. 3 is a top plan view of the head end of the fastener embodiment of FIG. 1.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms “horizontal”, “vertical”, “left”, “right”, “up” and “down”, as well as adjectival and adverbial derivatives thereof (e.g., “horizontally”, “rightwardly”, “upwardly”, etc.), simply refer to the orientation of the illustrated structure as the particular drawing figure faces the reader. Similarly, the terms “inwardly” and “outwardly” generally refer to the orientation of a surface relative to its axis of elongation, or axis of rotation, as appropriate.

Turning now to the drawing figures, an improved fastener with a protected decorative cap is provided, a first example embodiment of which is general indicated at 15 in FIGS. 1-13. As shown, fastener 15 includes fastener body 16 having tool-engaging head 18 at a first end thereof and fastening portion 19 at a second end thereof. Radially-enlarged medial portion 21 is optionally provided between tool-engaging head 18 and fastening portion 19. Although fastener body 16 is shown in the first example embodiment as having a particular configuration, it will be appreciated that other fastener embodiments could be constructed in which the fastener body has different configurations. Examples include, but are not limited to, the fastener embodiments shown in FIGS. 32-36 and described in more detail below.

Although not shown, fastening portion 19 of fastener body 16 may have threads for engaging a work piece (also not shown) on which fastener 16 is to be mounted. For example, if the fastener is a nut-style fastener (see the fastener embodiments of FIGS. 1-34), the threads will be internally formed on a bore extending inside the fastener body. If the fastener is a bolt-style fastener (see the fastener embodiments of FIGS. 35-36), the threads will be externally formed on the outside of a shank portion of the fastener body.

Medial portion 21 of the fastener embodiment 15 shown in FIGS. 1-13 is formed below the base of the tool-engaging head. In the fastener embodiment 15 of FIGS. 1-13, and also in the example embodiments shown in FIGS. 14-15, 16-17, 18-19 and 29-30, medial portion 21 is shown as including a defined, radially-protruding seat flange 22, but this is for purposes of illustration only, and not by way of limitation. The fastener embodiments of FIGS. 32-36 illustrate alternative constructions wherein the fastener medial portion has different configurations.

It should be understood that, for purposes of the present disclosure, the medial portion is completely optional. For example, although not shown, a bolt fastener embodiment could be constructed that has an externally threaded shank extending from the bottom face of the fastening end to the base of the tool-engaging head. In that case, the fastener body would have a tool-engaging head and a fastening portion, but no separately configured medial portion. Alternatively, a nut fastener embodiment could be constructed in which the tool-engaging head extends for the entire length of the fastener, such that there is again no separately-defined medial portion.

Figure 4:
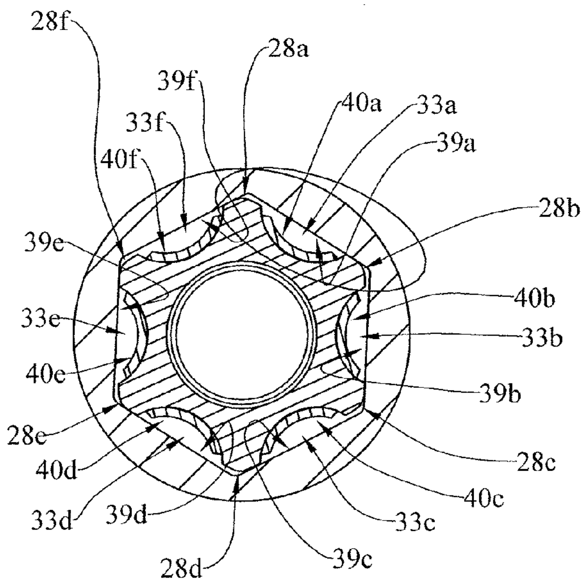
FIG. 4 is a cross-sectional view taken through the head of the fastener embodiment of FIG. 1 and showing a socket wrench socket engaging the head for torquing.
Figure 5:
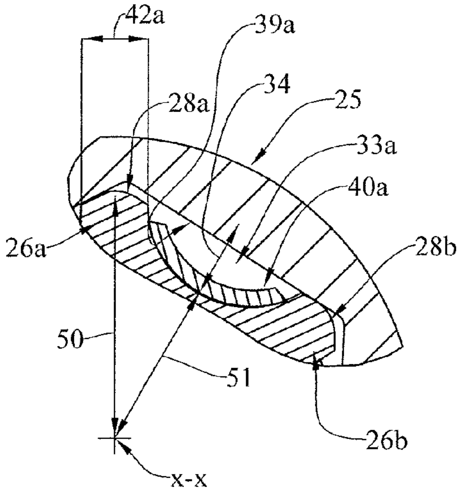
FIG. 5 is an enlarged cross-sectional view of an inset portion of FIG. 4, taken within the indicated circle of FIG. 4.
Figure 4A:
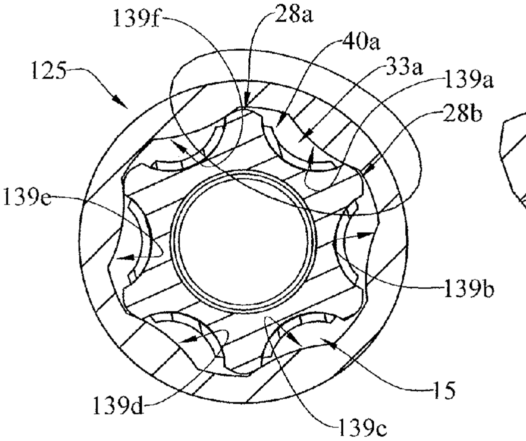
FIG. 4A is a cross-sectional view taken through the head of the fastener embodiment of FIG. 1 and showing a first alternative socket wrench socket engaging the head for torquing.
Figure 5A:
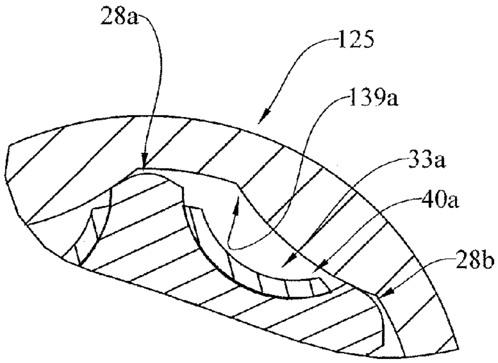
FIG. 5A is an enlarged cross-sectional view of an inset portion of FIG. 4A, taken within the indicated circle of FIG. 4A.
Figure 4B:
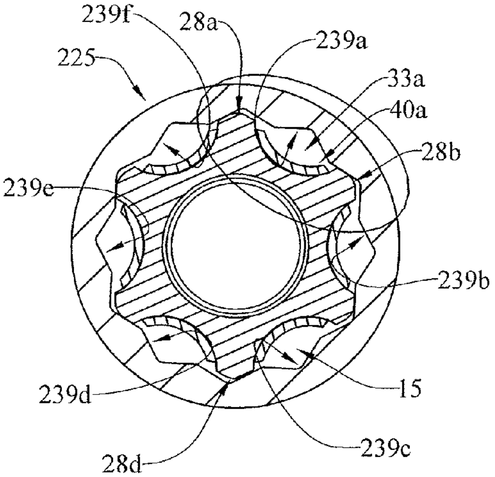
FIG. 4B is a cross-sectional view taken through the head of the fastener embodiment of FIG. 1 and showing a second alternative socket wrench socket engaging the head for torquing.
Figure 5B:
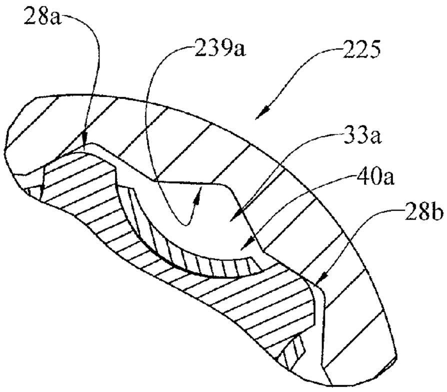
FIG. 5B is an enlarged cross-sectional view of an inset portion of FIG. 4B, taken within the indicated circle of FIG. 4B.
Figure 6:
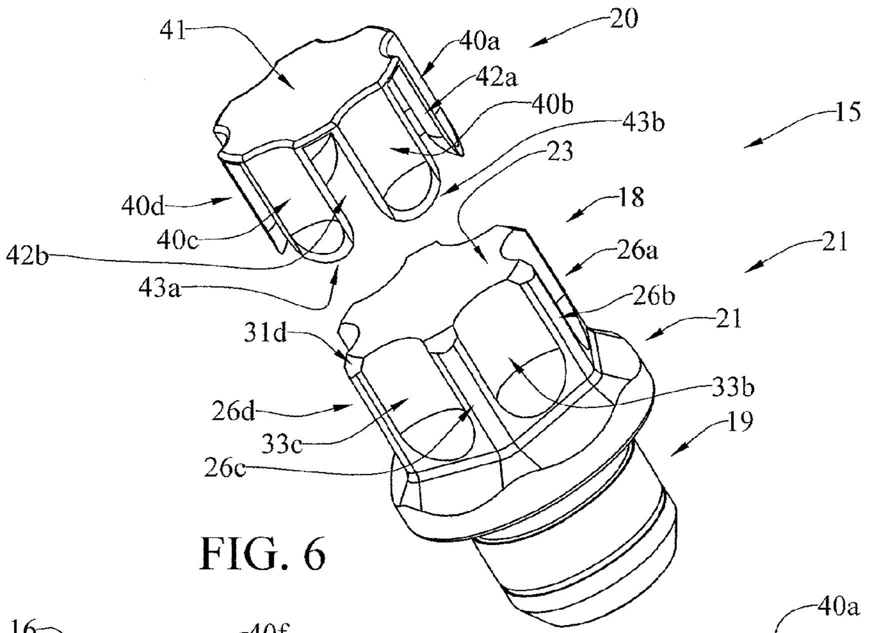
FIG. 6 is an exploded perspective view of the fastener embodiment of FIG. 1 separately illustrating an example fastener body and an example protected decorative cap.
Figure 7:
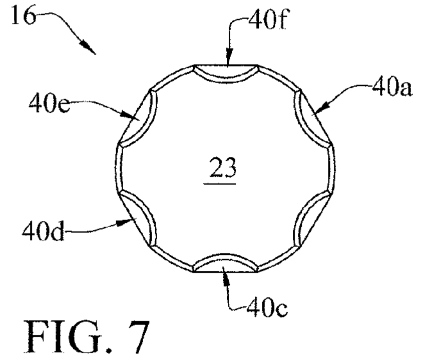
FIG. 7 is a top plan view of the protected decorative cap shown in FIG. 6.
Figure 8:
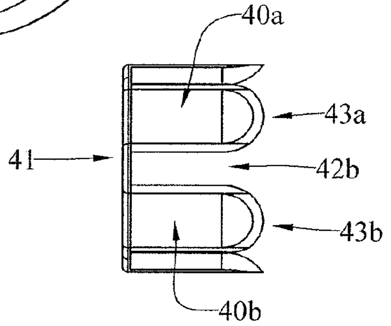
FIG. 8 is a side elevation view of the protected decorative cap of FIG. 6.
Figure 9:
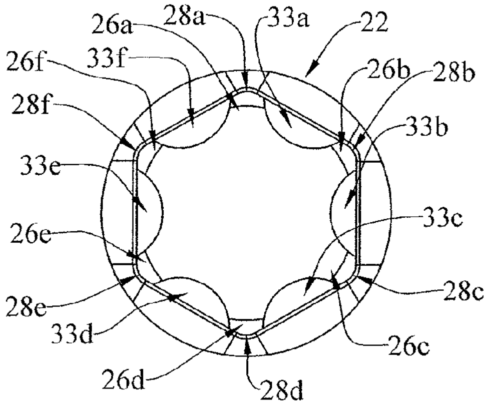
FIG. 9 is a top plan view of the fastener body shown in FIG. 6.
Figure 10:
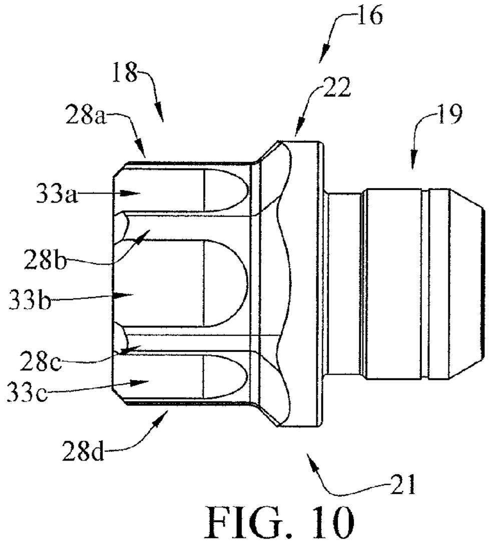
FIG. 10 is a side elevation view of the fastener body of FIG. 6.
Figure 11:
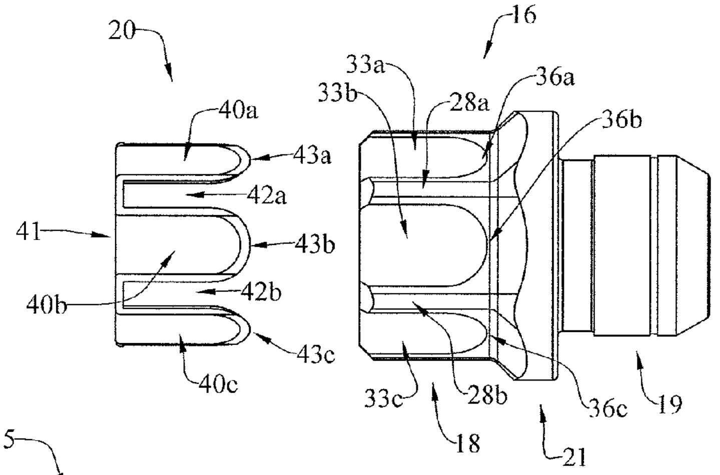
FIG. 11 is an exploded side elevation view showing the protected decorative cap and the fastener body of FIG. 6 prior to assembly.
Figure 12:
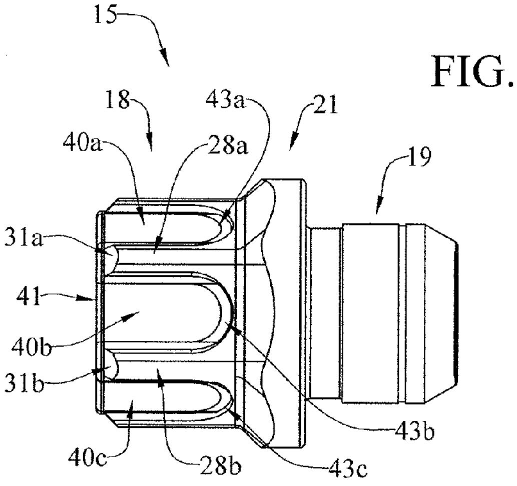
FIG. 12 is a side elevation view of the protected decorative cap and the fastener body of FIG. 6 following assembly.
Figure 13:
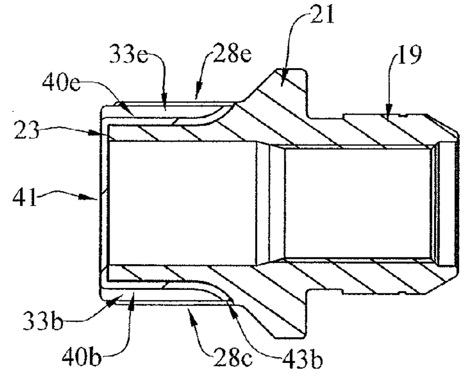
FIG. 13 is a cross-sectional centerline view of the assembled fastener of FIG. 12.

In the example embodiment 15 of FIGS. 1-13, tool-engaging head 18 has a generally radially-extending end face 23 and a generally-longitudinally extending sidewall portion 24 configured to engage a fastener torquing tool. FIGS. 4 and 5 illustrate one example fastener torquing tool embodied as a hexagonal socket 25 for a socket wrench. In all of the fastener embodiments of FIGS. 1-36, generally radially-extending end face 23 of tool-engaging head 18 is illustrated as being generally flat. However, this is for purposes of illustration only and not by way of limitation. Other fastener embodiments could be easily constructed in which the generally radially-extending end face has a non-planar configuration, such as a dome-shape, a frustoconical shape, a pyramid shape, etc.

With continuing reference now to FIGS. 1-13, sidewall portion 24 of tool-engaging head 18 of the first fastener embodiment 15 comprises a set of generally longitudinally-extending tool-engaging ridges 26*a*-26*f*, with each tool-engaging ridge protruding generally radially outwardly from a ridge base to a ridge tip 28. The surface contour of each tool-engaging ridge may comprise an suitable tool-engaging configuration. FIGS. 4/5, 4A/5A and 4B/5B illustrate different torquing tools engaging the tool-engaging head, namely, a six-point socket 25, a flank drive socket 125, and a twelve-point socket 225. As can be seen, the tool-engaging ridges 26*a*-26*f* may be formed with two sides of generally concave curvature and a generally rounded apex portion. However, this is for purposes of example only, and it will be appreciated that other tool-engaging ridge configurations could also be used. In the longitudinal direction, each tool-engaging ridge has a first end 31*a*-31*f* that may be located proximate to the end face 23 of the tool-engaging head 18, and a second end 32*a*-32*f* that may merge with the structure that forms the base of the tool-engaging head 18 and/or the fastener's medial portion 21. Other fastener designs may also be envisioned in which the second ends of the tool-engaging ridges do not merge into other structure of the fastener body, and instead have a defined terminus, like the first end. This effect could be achieved by reducing the nominal cross-sectional size of the fastener body in the region where the tool-engaging ridges terminate.

The sidewall portion 24 of the tool-engaging head 18 further includes a set of generally longitudinally-extending radially-recessed flutes 33*a*-33*f* between the ridge tips 28*a*-28*f*, respectively. As used herein, the term "flute" is not intended to signify any particular configuration, but merely that the tool-engaging head 18 is recessed between the ridge tips 28*a*-28*f* to provide areas that a fastener torquing tool 25 will not engage when torquing the fastener. In these recessed areas between the ridge tips 28*a*-28*f*, there will be a gap (however small) between the torquing tool 25 and the tool engaging head 18 that receives corresponding portions of the protected decorative cap 20, as described in more detail below. The depth 34 of flutes 33*a*-33*f* is dictated by the height or radius 50 of ridge tips 28*a*-28*f* of the tool-engaging ridges 26*a*-26*f*, and may be selected according to design requirements.

Each flute may have an open first end 35*a*-24*f* that is located proximate to the end face 23 of the tool-engaging head 18, and a second closed end 36*a*-36*f* that merges with the fastener body's medial portion 21 at the base of the tool-engaging head 18. In most of the embodiments disclosed herein (e.g. see FIG. 6), the flutes are configured with a curved cross section profile along their length. In these embodiments, the flutes are shown with the closed second ends also being curved in accordance with their diminishing depth at the second end termination location. However, this is for purposes of example only, and not by way of limitation. It will be appreciated that many other flute configurations could also be used. For example, as will be described in more detail below in connection with FIGS. 23-25 and 26-28, the flutes could have a flat cross section profile along their length, and their closed ends could be either curved or flat. Other fastener embodiments may also be envisioned in which the second ends of the flutes are open rather than closed. This could be achieved by extending the flutes in the direction of the fastening end as far as necessary to pass through any intervening material and create the open second ends.

In each of FIGS. 1-36, the tool-engaging head 18 has a generally hexagonal configuration (when viewed from the end face) to match the hexagonal configuration of the torquing tool shown in FIGS. 4/5, 4A/5A and 4B/5B. Each pair of adjacent tool-engaging ridges 26*a* and 26*b*, 26*b* and 26*c*, 26*c* and 26*d*, 26*d* and 26*e*, and 26*e* and 26*f*, and the flutes 33*a*-33*f* there between represents one "side" 39*a*-39*f*, 139*a*-139*f* or 239*a*-239*f*, respectively, of the tool-engaging head's generally hexagonal configuration. In the illustrated embodiments, there are six tool-engaging ridges 26*a*-26*f* and six flutes 33*a*-33*f*. It will be appreciated that many other tool-engaging head configurations could be used, including generally square shapes, generally octagonal shapes, etc. Irregular tool-engaging head configurations could also be used, such as shapes wherein the "sides" are of different length and the tool-engaging ridges are not equally spaced in order to provide a security feature wherein only certain a specially-configured tool can be used to torque the fastener.

It would also be permissible to provide fewer tool-engaging ridges and flutes than there are "sides" of the tool-engaging head. This is because the tool-engaging ridges 26*a*-26*f* and flutes 33*a*-33*f* are only needed to protect a corresponding portion 40*a*-40*f* of the protected decorative cap 20 that extends longitudinally over the sidewall portion 24 of the tool-engaging head 18. As described in more detail below, these longitudinal portions 40*a*-40*f* of the protected decorative cap 20 are referred to as fingers. They extend longitudinally from a generally radially-extending end face 26 of the protected decorative cap 20. Although the fastener embodiment of FIGS. 1-13 shows a protected decorative cap with six such fingers 40*a*-40*f*, respectively, extending over the six "sides" 39*a*-39*f* of the tool-engaging head 18, this configuration is not required. In other embodiments (not shown), there could be fewer (e.g., one, two, three or more) fingers than there are "sides" of the tool-engaging head. For example, a particular fastener manufacturer might wish to emphasize the end face of the protected decorative cap, and perhaps use only one or two fingers mainly to help secure the cap. In that case, the tool-engaging head of the fastener body would only need only one or two flutes and two or three tool-engaging ridges, respectively. The other "sides" of the tool-engaging head could be formed without flutes and tool-engaging ridges, and could instead have conventional straight sides and corners, as per a standard nut or bolt type fastener.

As summarized above, a protected decorative cap 20 is also provided on the tool-engaging head 18. The protected decorative cap 20 has a generally radially-extending end face 41 substantially covering the tool-engaging head end face 23, and a set of generally longitudinally-extending fingers 40*a*-40*f* that are disposed in the flutes 33*a*-33*f*, respectively. The fastener embodiments of FIGS. 1-36 each illustrate the generally radially-extending end face 41 of the protected decorative cap 20 as being generally flat. However, as in the case of the end face 23 of the tool-engaging head 18, this is for purposes of illustration only and not by way of limitation. Other fastener embodiments could be easily constructed in which the generally radially-extending end face of the protected decorative cap has a non-planar configuration, such as a dome-shape, a frustoconical shape, a pyramid shape, etc. This may be the case even if the end face of the tool-engaging head is flat, such that there is a gap underneath the end face of the cap.

The cap fingers 40*a*-40*f* are separated by circumferential spaces 42*a*-42*f* through which the ridge tips 28*a*-28*f* of the tool engaging head 18 protrude, and lie within the flutes 33*a*-33*f* of the tool engaging head 18 so as to be radially-recessed from the ridge tips 28*a*-28*f* and thereby protected from the fastener torquing tool 25. This can be seen in FIGS. 4/5, 4A/5A and 4B/5B, which illustrate how different fastener torquing tools of varying configuration can engage the tool-engaging ridges 26*a*-26*f* at or near the ridge tips 28*a*-28*f* without touching the protected decorative cap 20. This arrangement protects the decorative cap 20 from large torquing forces that could loosen it or mar its appearance.

Figure 14:
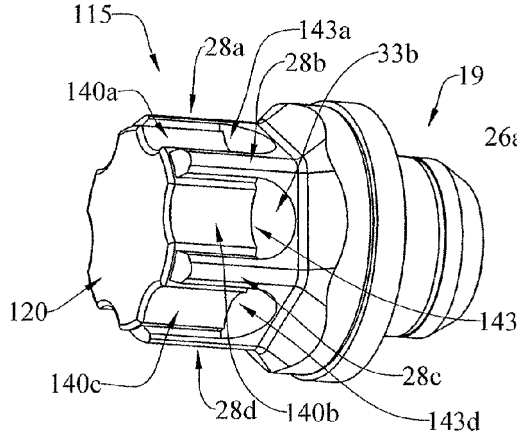
FIG. 14 is a perspective view showing a modified decorative cap and the fastener body of FIG. 6 following assembly to provide a second example fastener embodiment.
Figure 15:
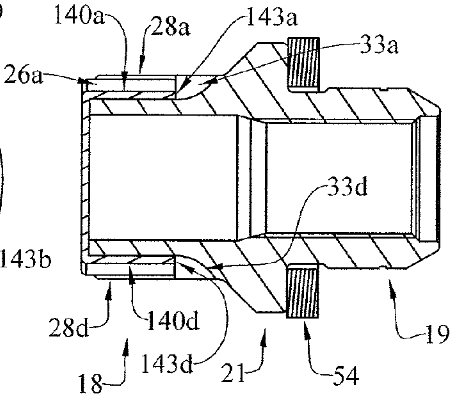
FIG. 15 is a cross-sectional centerline view of the assembled fastener modification shown in FIG. 14.

Note that the fingers 40*a*-40*f* of the protected decorative cap 20 need not be as long as illustrated in the illustrated embodiment of FIGS. 1-13. They could be made as short as is desired or as is required to help affix the protected decorative cap to the fastener body if the fingers are used for attachment purposes. If the cap fingers are shortened, the flutes of the tool-engaging head could also be shortened. Alternatively, the flutes could be relatively long while the cap fingers 140*a* and 140*b* are relatively short and have squared ends 143*a* and 143*d*, such that the fingers 140*a* and 140*b* do not extend the full length of the flutes. This is shown in FIGS. 14 and 15, which illustrate a second example fastener embodiment 115.

As used herein, the term "decorative" refers to the fact that the protected decorative cap 20 has a different surface appearance than the fastener body 16 for the purpose of altering (and preferably improving) the appearance of the fastener 15. The protected decorative cap 20 can be made "decorative" in any suitable fashion, such as by virtue of having a decorative color, material, or a coating thereon. Stainless steel would be one example of a material that imparts a decorative effect. Chrome plating and PVD coating (Physical Vapor Deposition) are two examples of coatings that may be used. Polymeric or other organic coatings could also be used. Alternative decorative effects could be provided by distinctive surface finishes, surface configurations, surface relief patterns, or applied design markings.

The protected decorative cap 20 can be attached to the tool-engaging head 18 in various ways, such as by adhesive bonding, mechanical fastening, or a combination of both techniques. For example, in the fastener shown in FIGS. 1-13, adhesive bonding could be used by applying a suitable adhesive between the opposing surfaces of the tool-engaging head 18 and the protected decorative cap 20.

Figure 16:
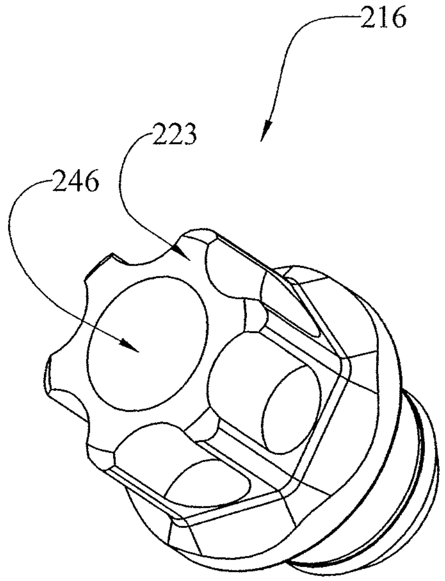
FIG. 16 is a perspective view showing a modified fastener body for use with a modified protected decorative cap as shown in FIG. 17 to provide a third example fastener embodiment that may be constructed in accordance with the present disclosure.
Figure 17:
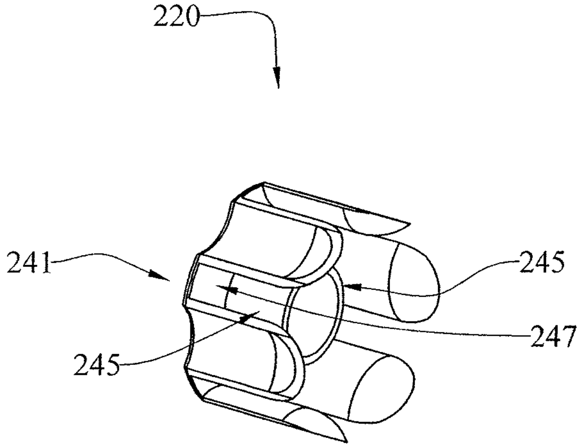
FIG. 17 is a perspective view showing a modified protected decorative cap for use with the modified fastener body of FIG. 16 to provide the third example fastener embodiment.

FIGS. 16 and 17 illustrate a third example fastener embodiment 215 in which a modified protected decorative cap 220 is mechanically fastened to a modified tool-engaging head 218 by way of a connector 245 that extends from an underside surface 247 of the protected decorative cap's end face 241 and engages a connector-receiving opening 246 in the end face 223 of the tool-engaging head 218. Adhesive bonding could also be used in addition to such mechanical fastening.

Figure 18:
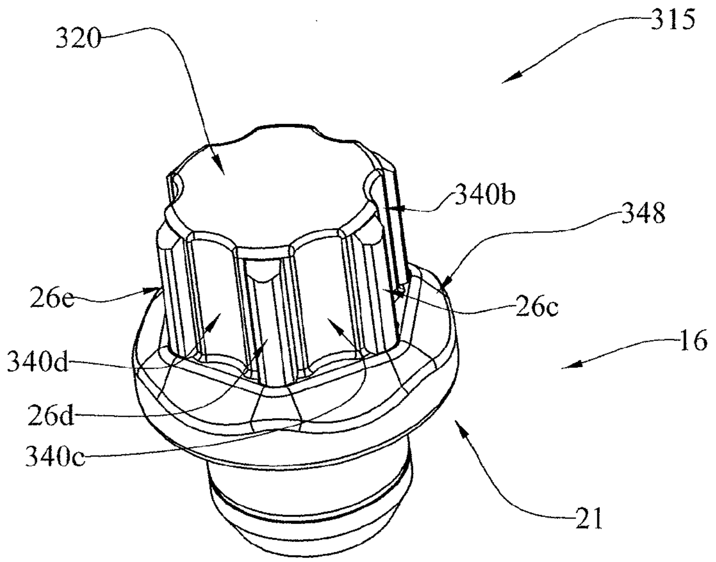
FIG. 18 is a perspective view showing a fourth example embodiment of a fastener that may be constructed in accordance with the present disclosure.
Figure 19:
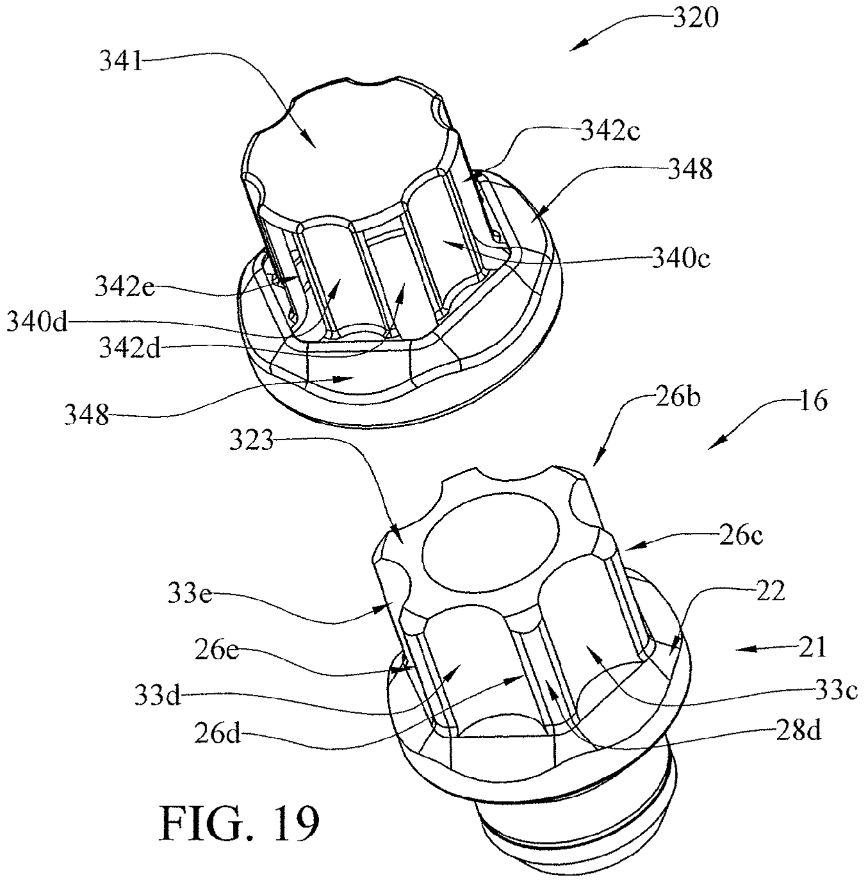
FIG. 19 is an exploded perspective view of the fastener embodiment of FIG. 18.

FIGS. 18 and 19 show a fourth example fastener embodiment 315 in which another modified protected decorative cap 320 includes a flange 348 that extends generally longitudinally and radially outwardly from the cap fingers 340*a*-340*f* and engages a radially-protruding seat flange 22 of the medial portion 21 of the fastener body 16. This provides additional surface area for attaching the protected decorative cap 320 to the tool-engaging head 318. In addition, the fastener's decorative effect is enhanced by the protected decorative cap's larger size and the fact that it now covers some or all of the fastener body's medial portion 21. In this embodiment, the second ends of the cap fingers 340*a*-340*f* are no longer free ends. They are interconnected by the flange portion 348 of the cap 320, which is generally ring-shaped in the illustrations of FIGS. 18 and 19. It will also be seen that the spaces 342*a*-342*f* between the cap fingers 340*a*-340*f* through which the fastener body's tool-engaging ridges 26*a*-26*f* protrude are closed ended slots.

Figure 20:
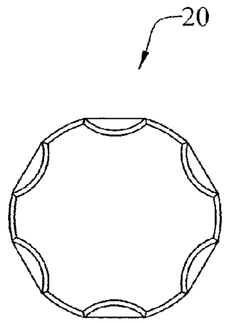
FIG. 20 is a top plan view reiterating the protected decorative cap of the first example fastener embodiment of FIGS. 1-13, and illustrating that the cap fingers may have a curved profile on their inside and outside surfaces.
Figure 21:
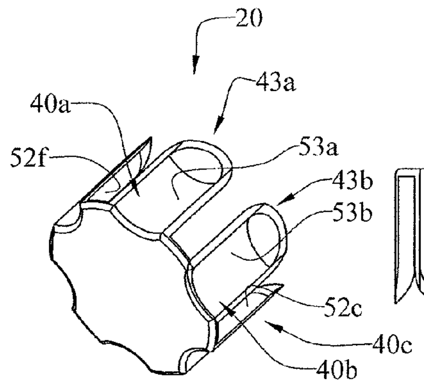
FIG. 21 is a perspective view reiterating the protected decorative cap of the first example fastener embodiment of FIGS. 1-13, and illustrating that the cap fingers may have both a curved profile on their inside and outside surfaces, and a curved bottom edge.
Figure 22:
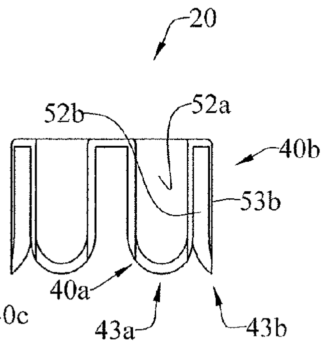
FIG. 22 is a cross-sectional centerline view reiterating the protected decorative cap of the first example fastener embodiment of FIGS. 1-13, and illustrating that the cap fingers may have a both a curved profile on their inside and outside surfaces, and a curved bottom edge.

As previously mentioned, the flutes on the tool-engaging head, as well as the fingers on the protected decorative cap, may have various configurations. In the embodiments of FIGS. 1-13, the flutes 33*a*-*f* and the cap fingers 40*a*-*f* have a curved cross section profile. In particular, the cap fingers have a curved profile on both their inside 52*a*-*f* and outside surfaces 53*a*-*f*. The free ends 43*a*-*f* of the cap fingers are also curved to match the curvature at the closed end 35*a*-*f* of each flute 33*a*-*f*. This configuration of the cap fingers is also shown in FIGS. 20-22.

Figure 23:
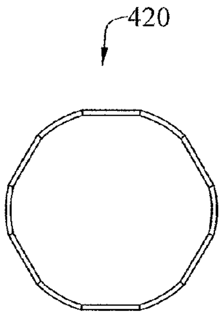
FIG. 23 is a top plan view showing a modified protected decorative cap that may be constructed in accordance with the present disclosure, and illustrating that the cap fingers may have a flat profile on their outside surface and a curved profile on their inside surface.
Figure 24:
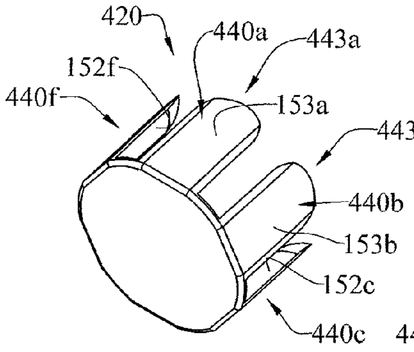
FIG. 24 is a perspective view showing the modified cap of FIG. 21, and illustrating that the cap fingers may have a flat profile on their outside surface, a curved profile on their inside surface, and a curved bottom edge.
Figure 25:
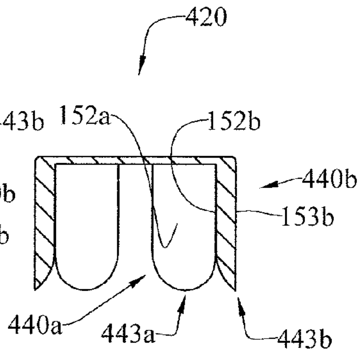
FIG. 25 is a cross-sectional centerline view showing the modified cap of FIG. 21, and illustrating that the cap fingers may have a flat profile on their outside surface, a curved profile on their inside surface, and a curved bottom edge.

FIGS. 23-25 illustrate an alternative cap configuration 420 in which the cap fingers 440*a*-*f* have a flat cross section profile on their outside surface 153*a*-*f* and a curved profile on their inside surface 152*a*-*f*. The free ends 443*a*-*f* of the cap fingers 440*a*-*f* (and the base ends of the flutes) are curved as in FIGS. 20-22.

Figure 26:
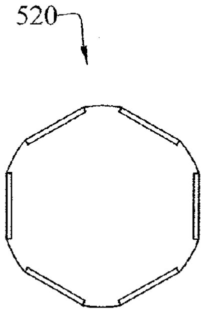
FIG. 26 is a top plan view showing another modified protected decorative cap that may be constructed in accordance with the present disclosure, and illustrating that the cap fingers may have a flat profile on their inside and outside surfaces.
Figure 27:
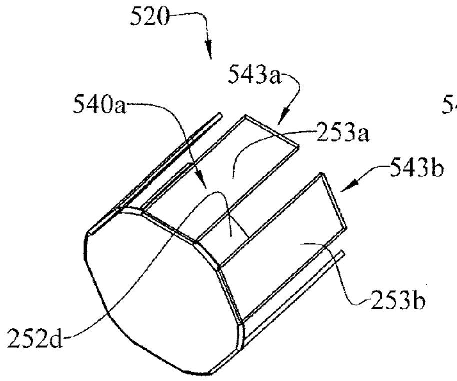
FIG. 27 is a perspective view showing the modified cap of FIG. 24, and illustrating that the cap fingers may have both a flat profile on their inside and outside surfaces, and a flat bottom edge.
Figure 28:
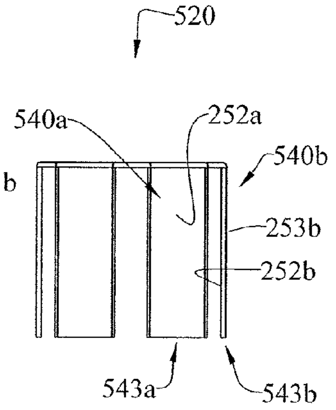
FIG. 28 is a cross-sectional centerline view showing the modified cap of FIG. 24, and illustrating that the cap fingers may have both a flat profile on their inside and outside surfaces, and a flat bottom edge.

FIGS. 26-28 illustrate another alternative configuration 520 in which the cap fingers 540*a*-*f* have a flat cross section profile on both their inside 252*a*-*f* and outside surfaces 253*a*-*f*. In that case, the flutes of the tool-engaging head may, if desired, also have a flat cross section profile (not shown). FIGS. 26-28 further illustrate that the ends 543*a*-*f* of the cap fingers 540*a*-*f* may also be flat.

Figure 29:
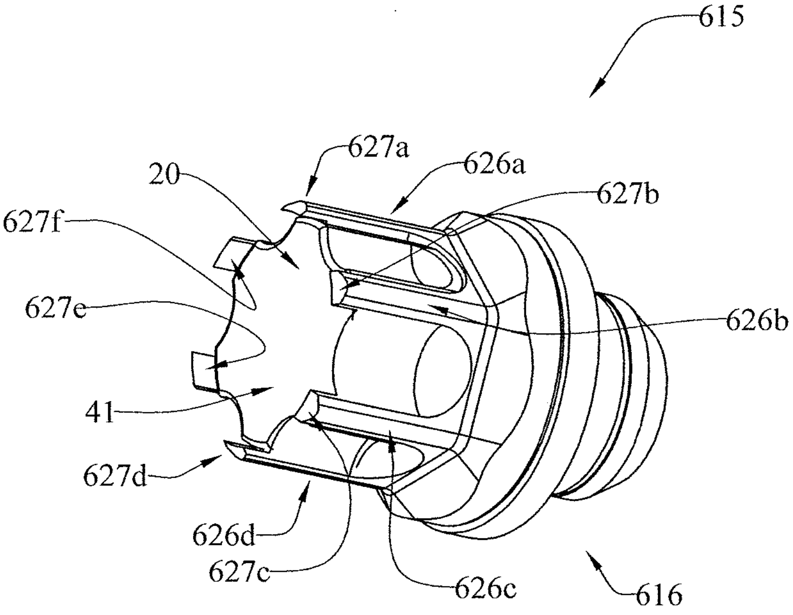
FIG. 29 is a perspective view showing a fifth example embodiment of a fastener that may be constructed in accordance with the present disclosure.

FIGS. 29 illustrates a fifth example fastener embodiment 615 in which the tool-engaging ridges 626*a*-*f* of fastener body 616 have portions 627*a*-*f* that extend longitudinally beyond the tool-engaging head end face and the end face 41 of the cap 20 in order to protect the decorative cap 20 end 41 and the tool-engaging head end face 623 from incidental contact with the torquing tool and from damage if the fastener is dropped, specifically a closed base end thereof, such as the inside bottom wall of a socket.

Figure 30:
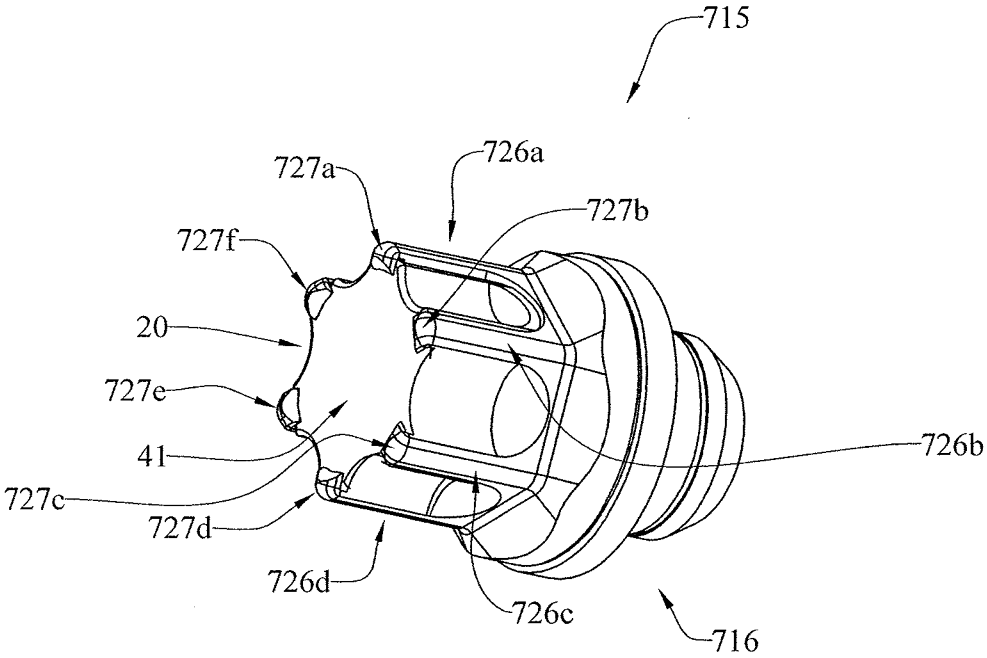
FIG. 30 is a perspective view showing a sixth example embodiment of a fastener that may be constructed in accordance with the present embodiment.
Figure 31:
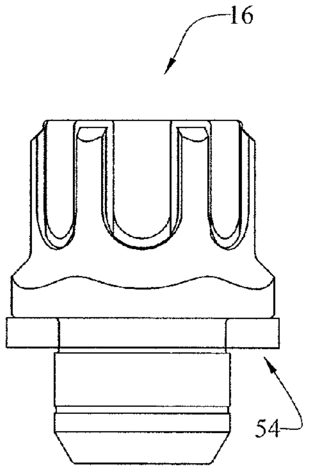
FIG. 31 is a side elevation view reiterating the fastener of FIG. 1, and illustrating that the fastener body is a nut-style fastener body having a flat seat and a spin washer.

FIG. 30 illustrates a sixth example fastener 715 wherein the end portions 727*a*-*f* of the tool-engaging ridges 726*a*-*f* of fastener body 716 extend longitudinally beyond the end face 41 of the cap 20 and the tool-engaging head end face and are also crimped over the tool-engaging head face and the end face 41 of cap 20.

Both the fifth and sixth fastener embodiments would lend themselves to fastener constructions in which the protected decorative cap has only a radially-extending end face, and no fingers. In that case, the longitudinal extensions 627*a*-*f* and 727*a*-*f* of the tool-engaging ridges would protect the cap end face 41, and no further cap protection structure would be necessary. In particular, no flutes would be needed and the tool-engaging ridges themselves could be quite short. The use of a protected cap having no fingers also allows the use of other cap protective structures besides tool-engaging ridges, such as a continuous or partially continuous ridge around the perimeter of the end face of the tool engaging head. The protected decorative cap with no fingers could be protectively disposed inside this ridge. Before leaving the subject of alternative cap protection arrangements, it should be further noted that a protected cap comprising a plurality of disconnected fingers and no interconnected end face could also be used. In that case, the fingers would lie within the flutes of the tool-engaging head, and the end face of head would be uncovered.

Figure 32:
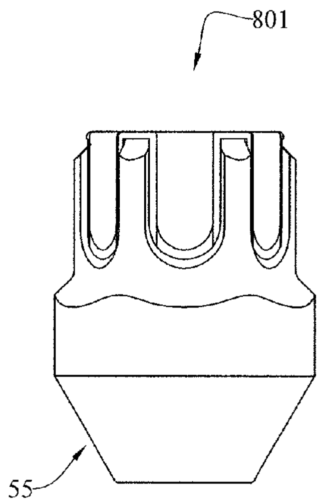
FIG. 32 is a side elevation view showing a seventh example embodiment of a fastener that may be constructed in accordance with the present disclosure, having a nut-style fastener body and a solid cone seat.
Figure 33:
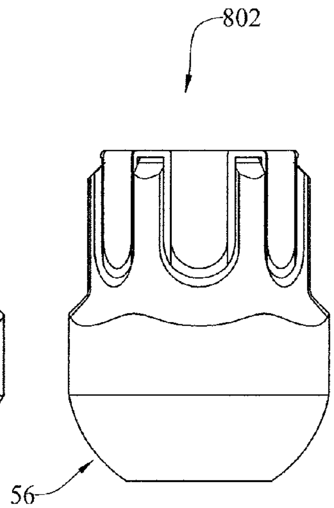
FIG. 33 is a side elevation view showing an eighth example embodiment of a fastener that may be constructed in accordance with the present disclosure, having a nut-style fastener body and a solid radius seat.
Figure 34:
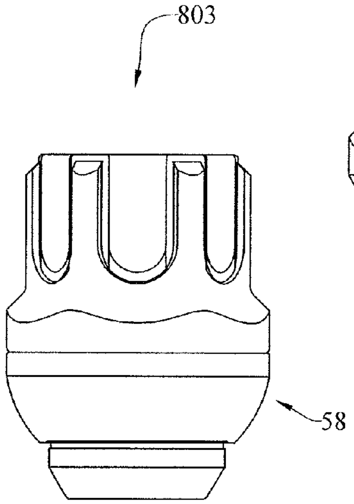
FIG. 34 is a side elevation view showing ninth embodiment of a fastener that may be constructed in accordance with the present disclosure, having a nut-style fastener body and a radius seat washer.
Figure 35:
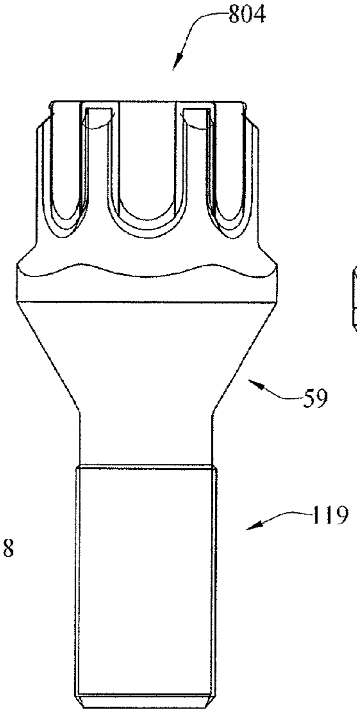
FIG. 35 is a side elevation view showing a tenth embodiment of a fastener that may be constructed in accordance with the present disclosure, having a bolt-style fastener body and a solid cone seat.
Figure 36:
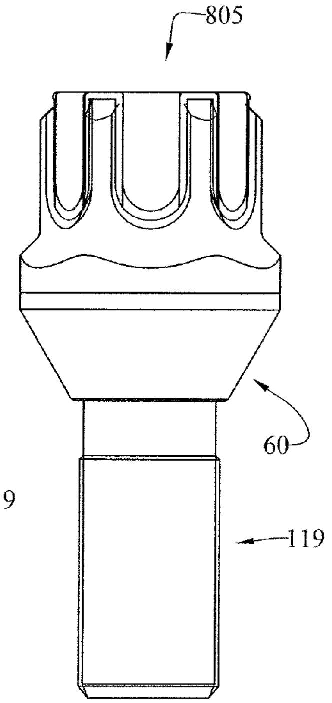
FIG. 36 is a side elevation view showing an eleventh embodiment of a fastener that may be constructed in accordance with the present disclosure, having a bolt-style fastener body and a cone seat washer.
Figure 37:
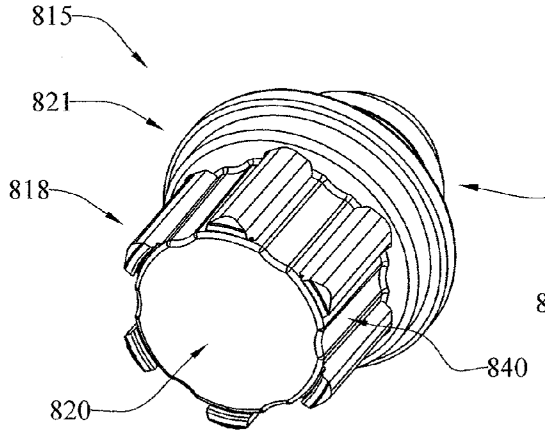
FIG. 37 is a perspective view showing a twelfth embodiment of a fastener that may be constructed in accordance with the present disclosure, having a flat seat nut-style fastener body and snap fit cap.
Figure 38:
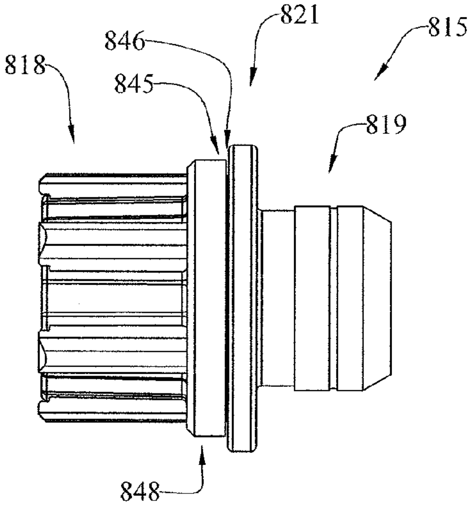
FIG. 38 is a side elevation view the fastener embodiment of FIG. 37.
Figure 39:
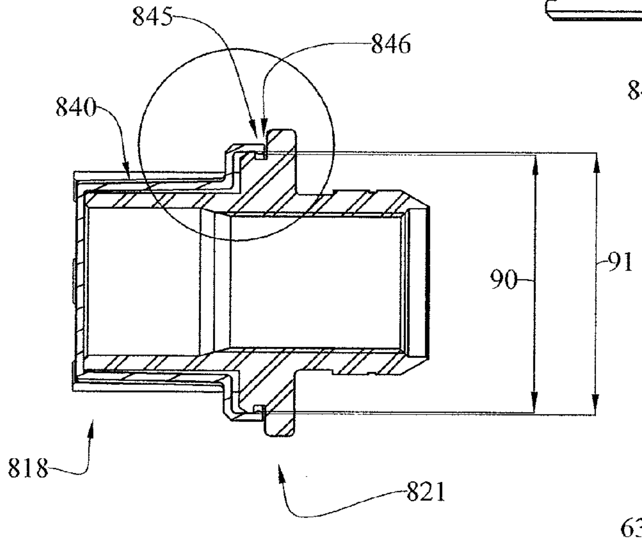
FIG. 39 is a cross-sectional view taken through the head of the fastener embodiment of FIG. 38.
Figure 40:
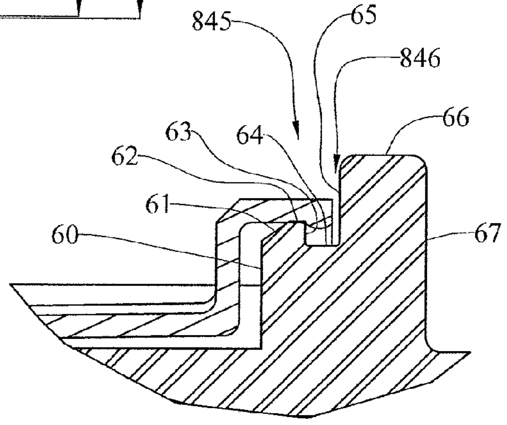
FIG. 40 is an enlarged cross-sectional view of the snap fit portion of FIG. 39, taken within the indicated circle of FIG. 39.
Figure 41:
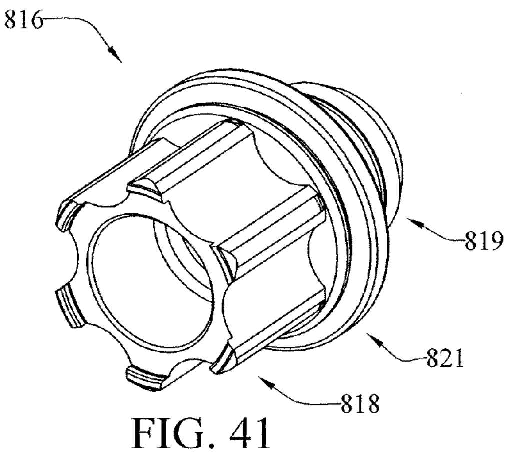
FIG. 41 is a perspective view of the fastener body shown in FIG. 37.
Figure 42:
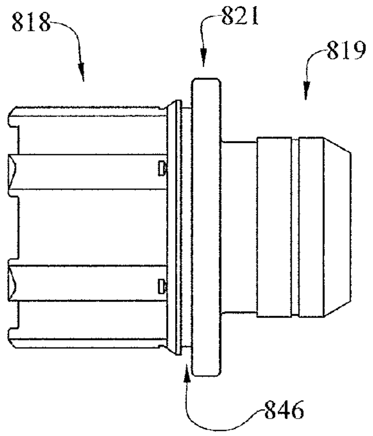
FIG. 42 is a side elevation view of the fastener body shown in FIG. 41.
Figure 43:
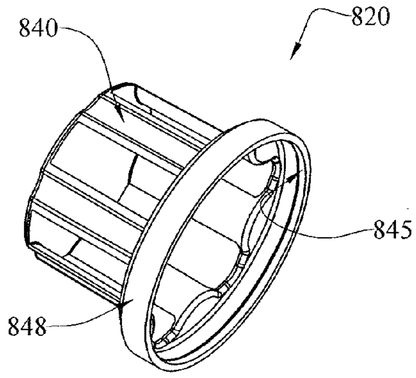
FIG. 43 is a perspective view of the cap shown in FIG. 37.
Figure 44:
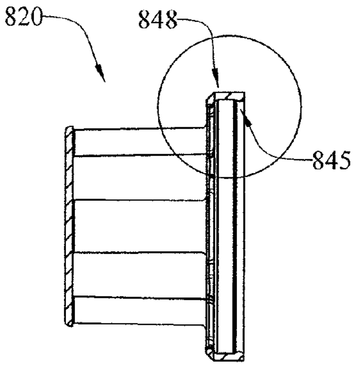
FIG. 44 is a side elevation view of the cap shown in FIG. 43.
Figure 45:
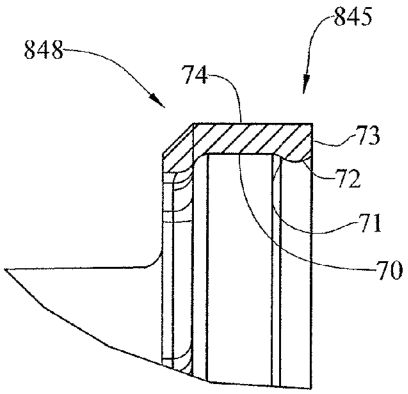
FIG. 45 is an enlarged cross-sectional view of the snap ring shown in FIG. 44, taken within the indicated circle of FIG. 44.
Figure 46:
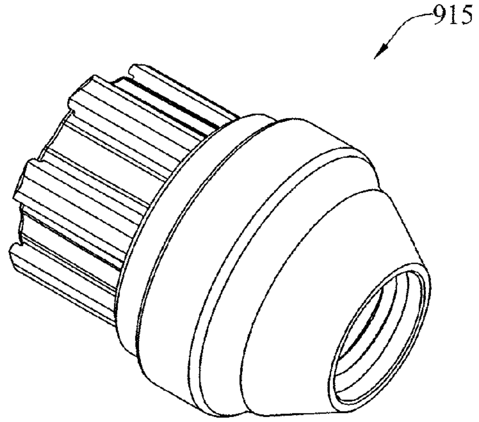
FIG. 46 is a perspective view showing a thirteenth embodiment of a fastener that may be constructed in accordance with the present disclosure, having a cone seat nut-style fastener body and resin fit cap.
Figure 47:
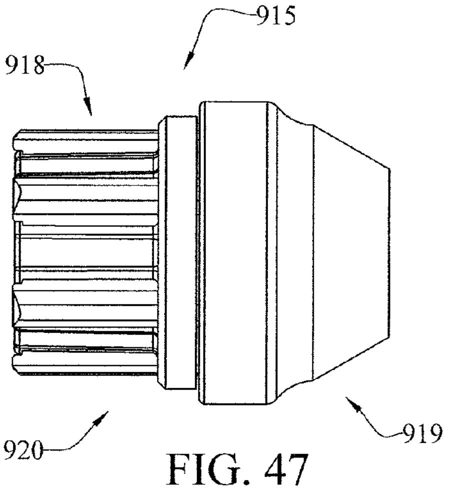
FIG. 47 is a side elevation view the fastener embodiment of FIG. 46.

As previously mentioned, and without limitation, a fastener constructed in accordance with the present disclosure may be embodied as a design selected from the group consisting of vehicle lug nuts and lug bolts. For example, in FIG. 31, which reiterates the first fastener embodiment of FIGS. 1-13, the fastener comprises a nut-style fastener body 16 having a flat seat and a spin washer 54. In FIG. 32, a seventh example fastener embodiment comprises a nut-style fastener body 801 having a solid cone seat 55. In FIG. 33, an eighth example fastener embodiment comprises a nut-style fastener body 802 having a solid radius seat 56. In FIG. 34, a ninth example fastener embodiment comprises a nut-style fastener 803 body having a radius seat washer 58. In FIG. 35, a tenth example fastener embodiment comprises a bolt-style fastener body 804 having a bolt type fastener portion 119 having a solid cone seat 59. In FIG. 36, an eleventh example fastener embodiment comprises a bolt-style fastener body 805 having bolt type fastener portion 119 having a cone seat washer 60.

FIGS. 37-45 show a twelfth example fastener embodiment 815 in which a modified protective decorative cap 820 is mechanically fastened to a modified tool-engaging head 818 by way of snap ring 845 that engages a groove 846 in the fastener body 816.

As shown, fastener 815 includes a fastener body 816 having a tool engaging head 818 at a first end thereof and a fastening portion 819 at a second end thereof. Radially-enlarged medial portion 821 is provided between tool engaging head 818 and fastening portion 819. In this embodiment, radially-enlarged medial portion 821 is a specially-configured generally cylindrical structure elongated along axis x-x and having a specially configured outer profile. In particular, and with reference to FIGS. 39 and 40, medial portion 821 is a specially-configured cylindrical member elongated along axis x-x, and is bounded by leftwardly-facing annular vertical surface 60, leftwardly and outwardly-facing frusto-conical surface 61, outwardly-facing horizontal cylindrical surface 62, rightwardly-facing annular vertical surface 63, outwardly-facing horizontal cylindrical surface 64, leftwardly-facing annular vertical surface 65, outwardly-facing horizontal cylindrical surface 66, and rightwardly-facing annular vertical surface 67. Rightwardly-facing annular vertical surface 63, outwardly-facing horizontal cylindrical surface 64, and the inner portion of surface leftwardly-facing annular vertical surface 65, generally define groove 846.

As shown, similar to the embodiment shown in FIGS. 18 and 19, decorative cap 820 includes flange 848 that extends generally longitudinally and radially outward from the cap fingers 840 and includes a snap ring portion 845 that engages groove 846 in medial portion 821 of fastener body 816. In particular, and with reference to FIGS. 44 and 45, flange 848 and snap ring portion 845 of cap 820 is generally bounded by inwardly-facing horizontal cylindrical surface 70, leftwardly and inwardly-facing concave surface 71, rightwardly and inwardly-facing concave surface 72, rightwardly-facing annular vertical surface 73, and outwardly-facing horizontal cylindrical surface 74.

The inner diameter 90 of surfaces 71,72 is less than the diameter 91 of the junction between surfaces 62 and 63. Thus, surface 63 provides a shoulder against which surface 71 of snap ring 845 of cap 820 bears. Flange element 848 is elastic such that surfaces 71, 72 can flex outwardly and be slid to the right up inclined surface 61 of medial portion 821 and over horizontal cylindrical surface 62 to snap radially inward into groove 846 of medial portion 821. The surfaces 71 and 72 of snap ring 845 are thereby retained in annular groove 846 to hold cap 820 to fastener body 816.

While in this embodiment snap ring 845 is a continuous ring-like structure, it is contemplated that other configurations may be used. For example, instead of a cylindrical flange 848 that extends generally outward from the ends of cap fingers 840, each of the cap fingers could have a separate flange portion with an inwardly extending protrusion that is received and held within groove 846. In addition, while groove 846 is shown in this embodiment as a continuous annular groove, it is contemplated that other surface profiles may be used to retain and engage the snap fit element to attach the decorative cap to the fastener body 816. For example, without limitation, circumferentially spaced notches may be used with corresponding snap fit elements. As another example, without limitation, a shoulder rather than a groove may be used.

Figure 48:
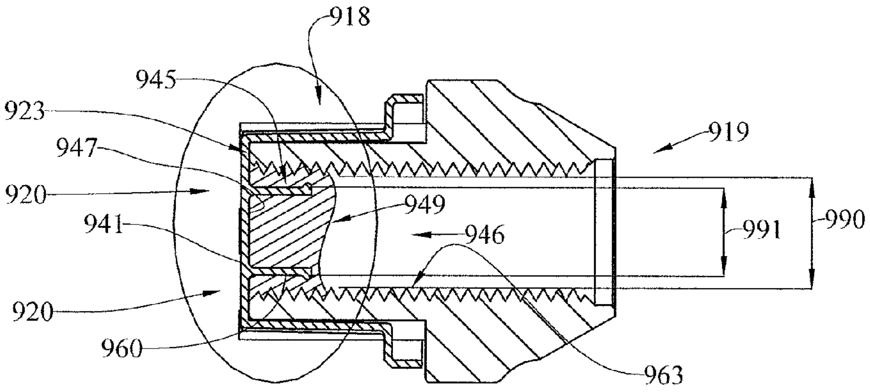
FIG. 48 is a cross-sectional view taken through the head of the fastener embodiment of FIG. 47.
Figure 49:
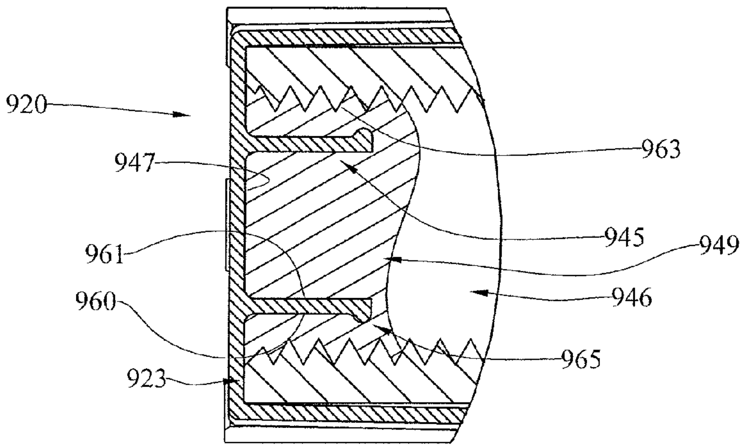
FIG. 49 is an enlarged cross-sectional view of the resin fit of FIG. 48, taken within the indicated circle of FIG. 48.
Figure 50:
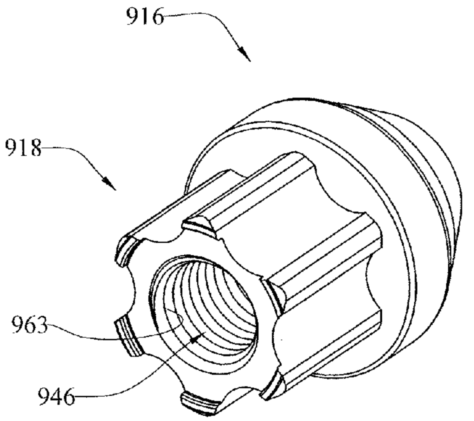
FIG. 50 is a perspective view of the fastener body shown in FIG. 46.
Figure 51:
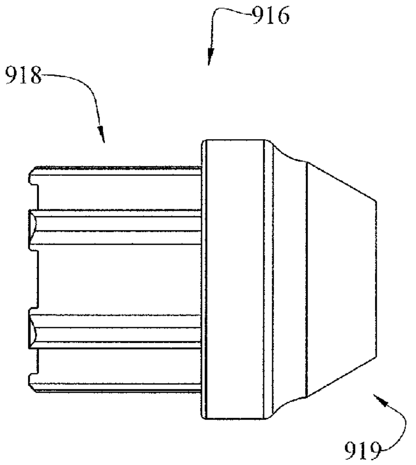
FIG. 51 is a side elevation view of the fastener body shown in FIG. 50.
Figure 52:
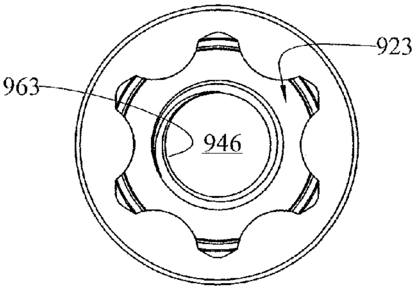
FIG. 52 is a left side elevation view of the fastener body shown in FIG. 51.
Figure 53:
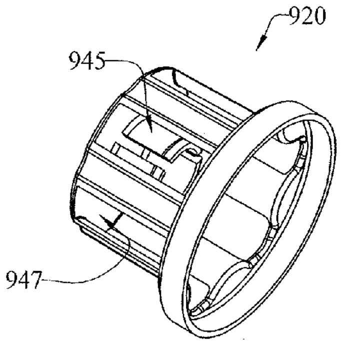
FIG. 53 is a perspective view of the cap shown in FIG. 46.
Figure 54:
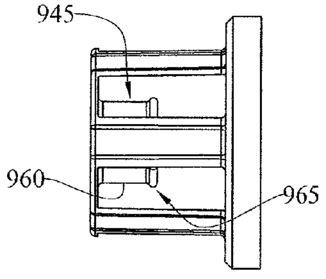
FIG. 54 is a side elevation view of the cap shown in FIG. 53.
Figure 55:
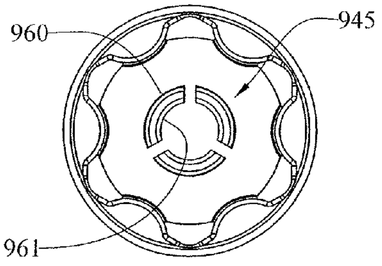
FIG. 55 is a right side elevation view of the cap shown in FIG. 54.

FIGS. 46-55 show a thirteenth example fastener embodiment 915. Similar to the third example of fastener embodiment 215 shown in FIGS. 16 and 17, cap 920 includes a cylindrical connector 945 than extends from the inner surface 947 of the decorative cap's end-face 941 into a connector-receiving opening 946 in the end face 923 of tool engaging head 918. As shown in FIGS. 48-49, connector 945 has a generally outwardly-facing horizontal cylindrical surface 960 and a generally inwardly-facing horizontal cylindrical surface 961. Opening 946 in tool engaging head 918 is defined by an inwardly-facing facing threaded cylindrical surface 963. As shown, the outer diameter 991 of outer surface 960 of connector 945 is significantly less than the inner diameter 990 of threaded surface 963 of opening 946 in tool-engaging head 918. Thus, in this embodiment, connector 945 extends freely into opening 946 such that the inner surface 947 of cap 920 abuts end-face 923 of tool-engaging head 918. To hold cap 920 in place, the space between the connector 945 and the inner surface 963 of opening 946 in tool-engaging head 918 is filled with a resin 949 that hardens to securely hold cap 920 in place on tool-engaging head 918 of fastener 915. The circumferential inner edge of connector 945 is bulbous and includes an outwardly-extending annular protrusion portion 965 that assists in engaging with resin 949. While in this embodiment bulbous end 965 of connector 945 and threaded surface 963 assists in holding resin 949 in place and thereby securing cap 920 to fastener 915, it is contemplated that connector 945 may be formed with alternative shapes and profiles and that similarly opening 946 may not include threaded surface or may be of a shape or configuration other than cylindrical.

Accordingly, an improved fastener having a protected decorative cap has been disclosed. While various embodiments of the fastener have been shown and described, it should be apparent that many variations and alternative embodiments could be implemented in accordance with the present disclosure. For example, virtually any style of fastener body may be combined with any style of protected decorative cap, so long as suitable provision is made for protecting the decorative cap from torquing forces applied by a fastener torquing tool that might otherwise damage, disfigure or loosen the cap. It is understood, therefore, that the invention is not to be in any way limited except in accordance with the scope of the appended claims.

The invention claimed is:

1. A fastener with a protected decorative cap comprising:

a fastener body orientated about a longitudinal axis and having a tool-engaging portion to which a driving torque may be applied, a threaded fastening portion configured and arranged to mate with a corresponding threaded element, and a groove or shoulder;

a decorative cap overlaying said tool-engaging portion;

said decorative cap comprising multiple open spaces and a snap-fit element;

said tool-engaging portion comprising multiple generally longitudinally-extending tool-engaging ridges configured to engage a fastener torquing tool;

each of said tool-engaging ridges protruding radially outward through at least one of said spaces in said decorative cap;

said groove or shoulder of said fastener body sized to engage said snap-fit element and said decorative cap attached to said tool-engaging portion by engagement of said snap-fit element with said groove or shoulder.

2. The fastener of claim 1, wherein said snap-fit element comprises an annular snap-fit ring, said annular groove or shoulder is sized to engage said annular snap-fit ring, and said decorative cap is attached to said tool-engaging portion by engagement of said annular snap-fit ring with said annular groove or shoulder.

3. The fastener of claim 2, wherein:

each of said longitudinally-extending tool-engaging ridges protrudes generally radially outwardly to an outer ridge line and said tool-engaging portion comprises longitudinally-extending radially-recessed flutes between said adjacent ridge lines;

said decorative cap comprises multiple longitudinally-extending cap fingers disposed in said flutes, said cap fingers being separated by said spaces through which said ridges protrude, and said cap fingers being radially-recessed from said ridge lines;

said decorative cap comprises a flange portion that extends generally longitudinally and radially outwardly from said cap fingers and engages a radially-enlarged medial portion of said fastener body; and said flange portion comprises a radially-inwardly extending annular snap-fit ring, said radially-enlarged medial portion of said fastener body comprises an annular groove sized to receive said annular snap-fit ring, and said decorative cap is attached to said tool-engaging portion by engagement of said snap-fit ring in said annular groove.

4. A fastener with a protected decorative cap comprising:

a fastener body orientated about a longitudinal axis and having a tool-engaging portion to which a driving torque may be applied and a threaded fastening portion configured and arranged to mate with a corresponding threaded element;

a decorative cap overlaying said tool-engaging portion;

said decorative cap comprising multiple open spaces a generally transversely-extending end face substantially covering said end face of said tool-engaging portion;

said tool-engaging portion comprising multiple generally longitudinally-extending tool-engaging ridges configured to engage a fastener torquing tool and a generally transversely-extending end face; and each of said tool-engaging ridges protruding radially outward through at least one of said spaces in said decorative cap and extending longitudinally beyond said end face of said tool-engaging portion in order to protect said end face portion of said decorative cap from said torquing tool.

5. The fastener of claim 4, wherein said end portions of said tool-engaging ridges that extend longitudinally beyond said end face of said tool-engaging portion are crimped over said end face of said decorative cap.

* * * * *